United States Patent
Kim (10) Patent No.: US 8,725,207 B2
(45) Date of Patent: May 13, 2014

(54) METHOD AND APPARATUS FOR DETERMINING POSTURE OF MOBILE TERMINAL

(75) Inventor: Moon Soo Kim, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 251 days.

(21) Appl. No.: 13/276,656

(22) Filed: Oct. 19, 2011

(65) Prior Publication Data

US 2012/0100888 A1 Apr. 26, 2012

(30) Foreign Application Priority Data

Oct. 25, 2010 (KR) ........................ 10-2010-0103970

(51) Int. Cl.
*H04M 1/00* (2006.01)

(52) U.S. Cl.
USPC ............... 455/556.1; 455/550.1; 455/567; 348/227.1; 348/460

(58) Field of Classification Search
USPC ........ 455/41.1, 41.2, 67.11, 68, 550.1, 556.1, 455/567; 348/227.1, 460, 552
See application file for complete search history.

(56) References Cited

U.S. PATENT DOCUMENTS

| 7,522,192 B2 * | 4/2009 | Kikkawa | 348/227.1 |
| 2007/0009135 A1 * | 1/2007 | Ishiyama | 382/103 |

FOREIGN PATENT DOCUMENTS

| JP | 2000-184013 A | 6/2000 |
| KR | 10-0833106 B1 | 5/2008 |

* cited by examiner

*Primary Examiner* — Tuan H Nguyen
(74) *Attorney, Agent, or Firm* — Jefferson IP Law, LLP (57) ABSTRACT

A method and apparatus for determining a posture of a mobile terminal are provided. The mobile terminal includes a first camera module located in a rear surface thereof and a second camera module located in a front surface thereof, and the method includes measuring illuminance in each of the first camera module and the second camera module, comparing an illuminance value measured in the first camera module and an illuminance value measured in the second camera module with a predetermined critical value, and determining a posture of the mobile terminal according to a result of the comparison. Therefore, a posture of the mobile terminal can be determined without an acceleration sensor or a gyro sensor.

15 Claims, 6 Drawing Sheets

METHOD AND APPARATUS FOR DETERMINING POSTURE OF MOBILE TERMINAL

PRIORITY

This application claims the benefit under 35 U.S.C. §119(a) of a Korean patent application filed on Oct. 25, 2010 in the Korean Intellectual Property Office and assigned Serial No. 10-2010-0103970, the entire disclosure of which is hereby incorporated by reference.

BACKGROUND OF THE INVENTION

1. Field of the Invention

The present invention relates to a method and apparatus for determining a posture of a mobile terminal. More particularly, the present invention relates to a method and apparatus for determining a posture of a mobile terminal using a camera module.

2. Description of the Related Art

With the recent rapid spread of mobile terminals, mobile terminals are now very widely used. Mobile terminals can provide various data transmission services and various additional services, as well as an intrinsic audio dedicated communication service, and thus have evolved to become multimedia communication devices in view of a function.

Technology for determining a posture of a mobile terminal and for converting a mode of the mobile terminal or for executing a specific function thereof is embodied within the mobile terminal. The mobile terminal generally includes an acceleration sensor or a gyro sensor therein and determines a posture thereof through a signal received from the sensor. That is, in order to apply the posture determination technology, the mobile terminal should have an acceleration sensor or a gyro sensor therein.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for determining a posture of a mobile terminal without an acceleration sensor or a gyro sensor.

In accordance with an aspect of the present invention, a method of determining a posture of a mobile terminal including a first camera module located in a rear surface thereof and a second camera module located in a front surface thereof is provided. The method includes measuring an illuminance in each of the first camera module and the second camera module, comparing an illuminance value measured in the first camera module and an illuminance value measured in the second camera module with a predetermined critical value, and determining a posture of the mobile terminal according to a result of the comparison.

In accordance with another aspect of the present invention, a mobile terminal is provided. The terminal includes a first camera module located in a front surface of the mobile terminal and for measuring illuminance, a second camera module located in a rear surface of the mobile terminal and for measuring illuminance, and a controller for comparing an illuminance value measured in the first camera module and an illuminance value measured in the second camera module with a predetermined critical value and for determining a posture of the mobile terminal according to a result of the comparison.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In exemplary embodiments of the present invention, a front surface of a mobile terminal includes a surface in which a display unit is located in the mobile terminal, and a rear surface of the mobile terminal includes a surface opposite to a surface in which the display unit is located.

In exemplary embodiments of the present invention, a mobile terminal may be a mobile communication terminal such as a Code Division Multiple Access (CDMA) terminal, a Wideband Code Division Multiple Access (WCDMA) terminal, or a Global System for Mobile communication (GSM) terminal, or may be a terminal such as a Personal Digital Assistant (PDA), a Portable Multimedia Player (PMP), or a Moving Picture Experts Group (MPEG)-1 or MPEG-2 Audio Layer-3 (MP3) player.

Figure 1:
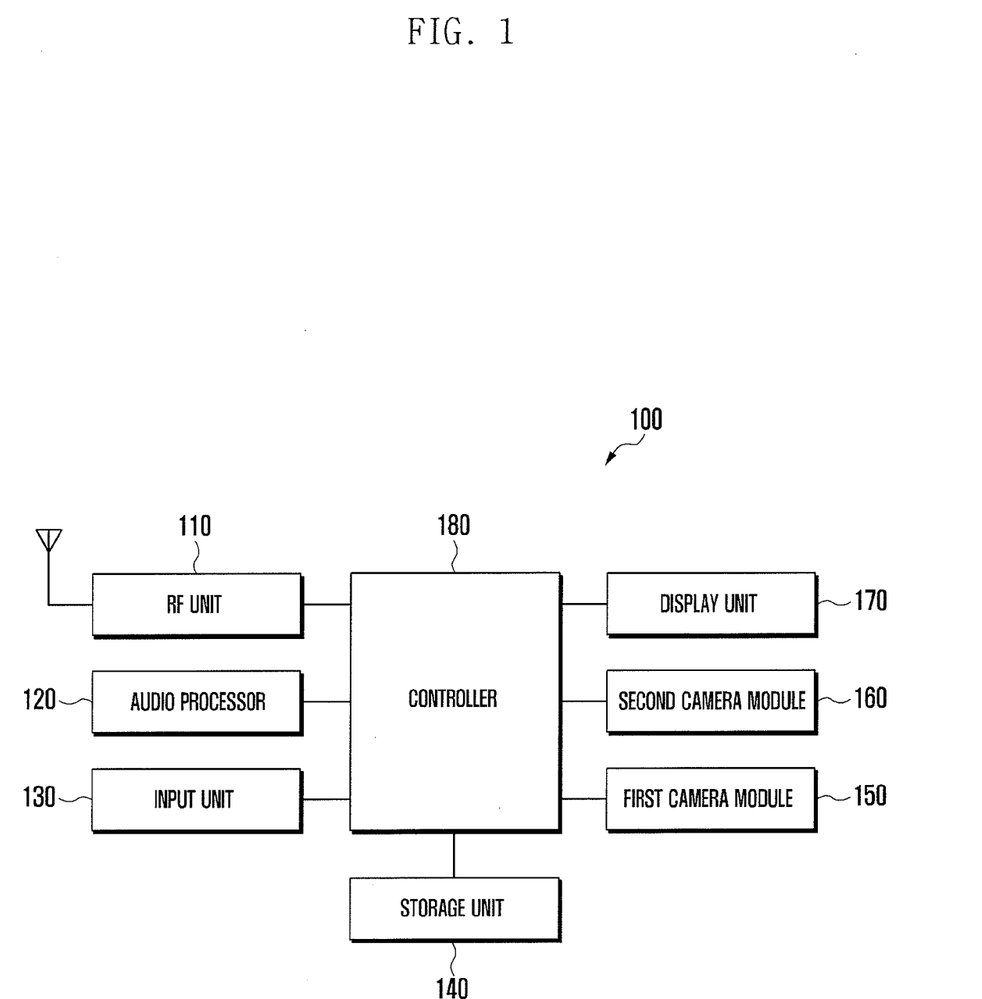
FIG. 1 is a block diagram illustrating a configuration of a mobile terminal according to an exemplary embodiment of the present invention.

FIG. 1 is a block diagram illustrating a configuration of a mobile terminal according to an exemplary embodiment of the present invention.

The mobile terminal 100 according to the present exemplary embodiment includes a Radio Frequency (RF) unit 110, an audio processor 120, an input unit 130, a storage unit 140, a first camera module 150, a second camera module 160, a display unit 170, and a controller 180.

The RF unit 110 performs transmission and reception functions of corresponding data for wireless communication of the mobile terminal 100. The RF unit 110 includes an RF transmitter for up-converting a frequency of a signal to be transmitted and amplifying the signal, and an RF receiver for down-converting a frequency of a received signal and low-noise amplifying the signal. Further, the RF unit 110 receives data through a wireless channel and outputs the data to the controller 180, and transmits data output from the controller 180 through the wireless channel.

The audio processor 120 is formed with a COder and DECoder (CODEC), and the CODEC includes a data CODEC for processing packet data and an audio CODEC for processing an audio signal such as sound. The audio processor 120 converts a digital audio signal to an analog audio signal through the audio CODEC and reproduces the analog audio signal through a speaker and converts an analog audio signal input from a microphone to a digital audio signal through the audio CODEC.

The input unit 130 receives a user's key manipulation signal for controlling the mobile terminal 100 and outputs the key manipulation signal to the controller 180. The input unit 130 may be formed as a keypad including numeral keys, character keys, and direction keys, such as a 3*4 pad and a QWERTY pad, or may be formed as a touch panel. Further, the input unit 130 may be formed as a button key, a jog key, and a wheel key. The input unit 130 generates an input signal for executing applications (a communication function, a music reproduction function, a moving picture reproduction function, an image display function, a camera photographing function, and a Digital Multimedia Broadcasting (DMB) broadcasting output function) of the mobile terminal 100 according to a user input and outputs the input signal to the controller 180.

The storage unit 140 performs a function of storing programs and data necessary for operating the mobile terminal 100, and is divided into a program area and a data area. The program area stores a program for controlling general operations of the mobile terminal 100 and an Operating System (OS) for booting the mobile terminal 100, an application program necessary for reproducing multimedia contents, and an application program necessary for other option functions, for example, a camera function, a sound reproduction function, and an image or moving picture reproduction function of the mobile terminal 100. The data area stores data generated according to use of the mobile terminal 100 and stores an image, a moving picture, a phonebook, and audio data.

The first camera module 150 and the second camera module 160 photograph a subject and include a camera sensor (not shown) for converting an optical signal to an electrical signal and a signal processor (not shown) for converting an analog image signal to digital data. Here, the camera sensor may be a Charge Coupled Device (CCD) sensor or a Complementary Metal Oxide Semiconductor (CMOS) sensor, and the signal processor may be a Digital Signal Processor (DSP). Further, the camera sensor and the signal processor may be formed in an integral form or in a separate form. In the present exemplary embodiment, the first camera module 150 and the second camera module 160 measure an illuminance of a periphery of the mobile terminal 100 and output measured illuminance values to the controller 180. In the present exemplary embodiment, the first camera module 150 is located in a rear surface of the mobile terminal 100, and the second camera module 160 is located in a front surface of the mobile terminal 100.

The display unit 170 may be one of a Liquid Crystal Display (LCD), Organic Light Emitting Diodes (OLED), and Active Matrix Organic Light Emitting Diodes (AMOLED) and visually provides a function menu of the mobile terminal 100, input data, function setting information, and various other information to a user. The display unit 170 performs a function of outputting a booting screen, a standby screen, a menu screen, a communication screen, and other application screens of the mobile terminal 100.

The controller 180 controls general operations of elements of the mobile terminal 100. In the present exemplary embodiment, the controller 180 controls the first camera module 150 and the second camera module 160 to measure illuminance of a periphery of the mobile terminal 100. The controller 180 controls the first camera module 150 and the second camera module 160 to periodically measure illuminance of a periphery of the mobile terminal 100 per predetermined cycle T. The controller 180 determines a first illuminance value A measured by the first camera module 150 and a second illuminance value B measured by the second camera module 160, and determines whether a value A/B, in which the first illuminance value A is divided by the second illuminance value B, is greater than or equal to a predetermined critical multiple value K.

If A/B is determined to be greater than or equal to K, the controller 180 determines that the mobile terminal 100 is in a state in which a rear surface is uncovered and a front surface is covered.

If A/B is determined to be equal to or less than 1/K, the controller 180 determines that the mobile terminal 100 is in a state in which a front surface is uncovered and a rear surface is covered.

If A/B is determined to be a value between 1/K and K, the controller 180 determines that the mobile terminal 100 is in a state where both a front surface and a rear surface are uncovered or covered.

In another exemplary embodiment of the present invention, the controller 180 determines a first illuminance value A measured by the first camera module 150 and a second illuminance value B measured by the second camera module 160 and compares each of A and B with a predetermined critical illuminance value L.

If A is determined to be greater than or equal to L and if B is determined to be less than L, the controller 180 determines that the mobile terminal 100 is in a state in which a rear surface is uncovered and a front surface is covered.

If B is determined to be greater than or equal to L and if A is determined to be less than L, the controller 180 determines that the mobile terminal 100 is in a state in which a front surface is uncovered and a rear surface is covered.

If both A and B are determined to be greater than or equal to L, or if both A and B are determined to be less than L, the controller 180 determines that the mobile terminal 100 is in a state where both a front surface and a rear surface are uncovered or covered.

In another exemplary embodiment of the present invention, the controller 180 determines a first illuminance value A measured by the first camera module 150 and a second illuminance value B measured by the second camera module 160, and compares a value A-B that subtracts the second illuminance value B from the first illuminance value A to a predetermined critical value M.

If A-B is determined to be greater than or equal to M, the controller 180 determines that the mobile terminal 100 is in a state in which a rear surface is uncovered and a front surface is covered.

If A-B is determined to be equal to or less than −M, the controller 180 determines that the mobile terminal 100 is in a state in which a front surface is uncovered and a rear surface is covered.

If A-B is determined to be a value between −M and M, the controller 180 determines that the mobile terminal 100 is in a state where both a front surface and a rear surface are uncovered or covered.

Figure 2A:
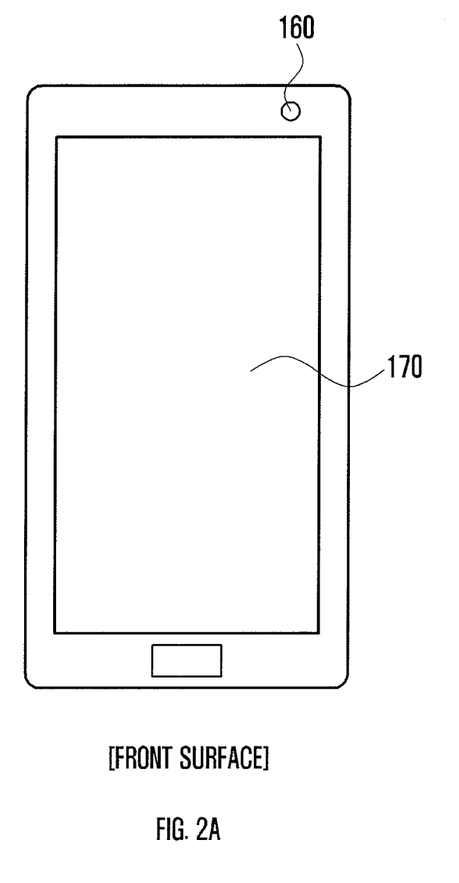
FIGS. 2A and 2B are diagrams illustrating a front surface and a rear surface of a mobile terminal according to an exemplary embodiment of the present invention.
Figure 2B:
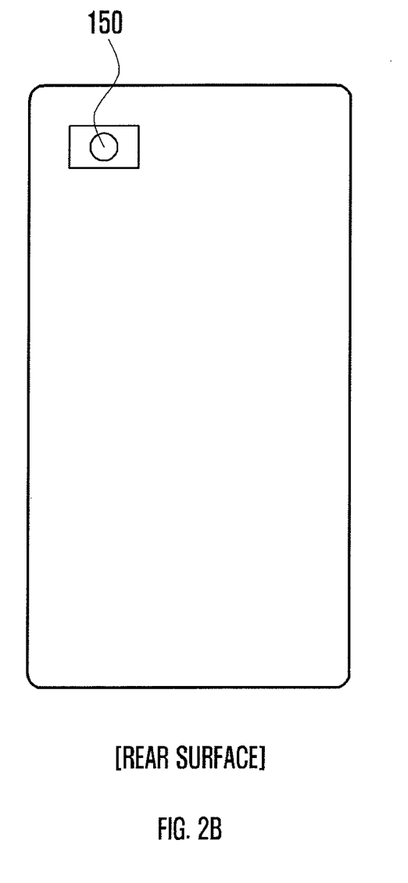

FIGS. 2A and 2B are diagrams illustrating a front surface and a rear surface of the mobile terminal 100 according to an exemplary embodiment of the present invention.

FIG. 2A illustrates a front surface of the mobile terminal 100, and in FIG. 2A, the second camera module 160 and the display unit 170 are located in the front surface of the mobile terminal 100. FIG. 2B illustrates a corresponding rear surface of the mobile terminal 100, and in FIG. 2B, the first camera module 150 is located in the rear surface of the mobile terminal 100. In exemplary embodiments of the present invention, a front surface and a rear surface are used as an opposite concept, and FIG. 2A may be referred to as a rear surface of the mobile terminal 100 and FIG. 2B may be referred to as a front surface of the mobile terminal 100.

Hereinafter, a method of determining a posture of the mobile terminal 100 is described.

Figure 3:
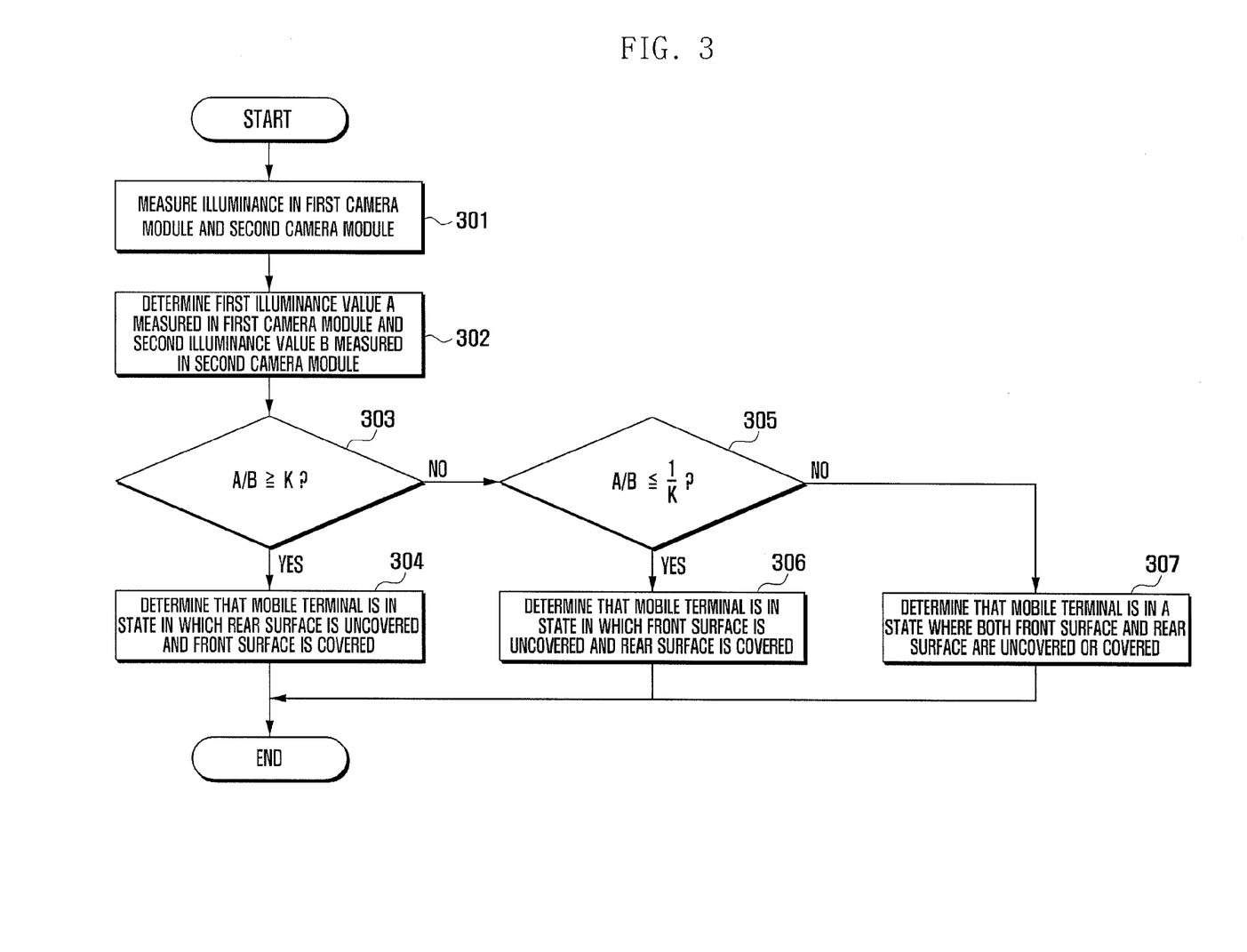
FIG. 3 is a flowchart illustrating a method of determining a posture of a mobile terminal according to a first exemplary embodiment of the present invention.

FIG. 3 is a flowchart illustrating a method of determining a posture of the mobile terminal according to a first exemplary embodiment of the present invention.

The controller 180 controls the first camera module 150 and the second camera module 160 to measure illuminance of a periphery of the mobile terminal 100 at step 301.

The controller 180 drives the first camera module 150 and the second camera module 160, and the first camera module 150 measures illuminance of a periphery thereof and outputs a first illuminance value to the controller 180, and the second camera module 160 measures illuminance of a periphery thereof and outputs a second illuminance value to the controller 180. In the present exemplary embodiment, the controller 180 includes a timer, and drives the first camera module 150 and the second camera module 160 according to a predetermined cycle T of the timer and controls the camera modules 150 and 160 to periodically measure illuminance of a periphery thereof In this case, the first camera module 150 and the second camera module 160 output illuminance values to the controller 180 per predetermined cycle T of the timer.

The controller 180 determines a first illuminance value A measured in the first camera module 150 and a second illuminance value B measured in the second camera module 160 at step 302.

When the controller 180 receives an illuminance value from the first camera module 150, the controller 180 recognizes the received illuminance value as the first illuminance value A, and when the controller 180 receives an illuminance value from the second camera module 160, the controller 180 recognizes the received illuminance value as the second illuminance value B. That is, the controller can distinguish between received illuminance values according to which camera module each illuminance value is received from.

The controller 180 obtains a value A/B in which the first illuminance value A is divided by the second illuminance value B, and determines whether A/B is greater than or equal to a predetermined critical multiple value K at step 303. When the mobile terminal 100 is put on a plane in which light is not transmitted, for example, an opaque surface of a table, desk, or shelf, one of the first camera module 150 and the second camera module 160 is covered by the plane and another one is uncovered. In this case, a difference exists between the first illuminance value A measured in the first camera module 150 and the second illuminance value B measured in the second camera module 160. A value in which the first illuminance value A is divided by the second illuminance value B corresponds to a multiple value of the second illuminance value B to the first illuminance value A, and K corresponds to a critical multiple value for determining whether the first camera module 150 is uncovered and the second camera module 160 is covered. That is, a step of determining whether A/B is greater than or equal to K is a step of determining whether the first illuminance value A is a numerical value at least K times as great as the second illuminance value B.

If it is determined in step 303 that A/B is greater than or equal to K, the controller 180 determines that the mobile terminal 100 is in a state in which a rear surface is uncovered and a front surface is covered at step 304.

For example, when K is preset to 10, and when A and B are measured as 300 lux and 20 lux, respectively, the controller 180 determines that A/B '15' is greater than or equal to K '10' and determines that the mobile terminal 100 is in a state in which a rear surface is uncovered and a front surface is covered. If a direction in which the display unit 170 of the mobile terminal 100 is put to face upward is referred as a forward direction, then in this example the controller 180 determines that the mobile terminal 100 is turned over.

Figures 4, 4A:
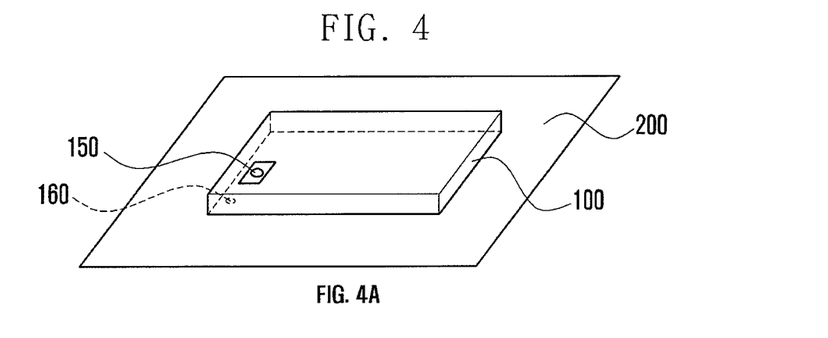
FIGS. 4A through 4D are perspective views illustrating posture forms of the mobile terminal of FIG. 1 according to an exemplary embodiment of the present invention.

FIGS. 4A through 4D are perspective views illustrating posture forms of the mobile terminal according to an exemplary embodiment of the present invention. More specifically, FIG. 4A illustrates the mobile terminal 100 in a state in which a rear surface is uncovered and a front surface is covered according to an exemplary embodiment of the present invention.

Referring to FIG. 4A, because the first camera module 150 is uncovered and the second camera module 160 is covered by a plane 200, an illuminance value measured in the second camera module 160 is relatively lower than an illuminance value measured in the first camera module 150. The controller 180 therefore determines that the mobile terminal 100 is in a state in which a rear surface is uncovered and a front surface is covered, through a comparison of the illuminance values. That is, FIG. 4A depicts a case where the mobile terminal is turned over so as to be face down on the plane 200.

If A/B is determined to be less than K at step 303, the controller 180 determines whether A/B is equal to or less than 1/K at step 305. Here, 1/K corresponds to a critical multiple value for determining whether the second camera module 160 is uncovered and the first camera module 150 is covered.

If A/B is determined to be equal to or less than 1/K, the controller 180 determines that the mobile terminal 100 is in a state in which a front surface is uncovered and a rear surface is covered at step 306. For example, when K is preset to 10, and when A and B are measured as 20 lux and 300 lux, respectively, the controller 180 determines that A/B '1/15' is equal to or less than 1/K '1/10' and therefore determines that the mobile terminal 100 is in a state in which a front surface is uncovered and a rear surface is covered. That is, the controller 180 determines that the mobile terminal 100 is put in a forward direction.

Figure 4B:
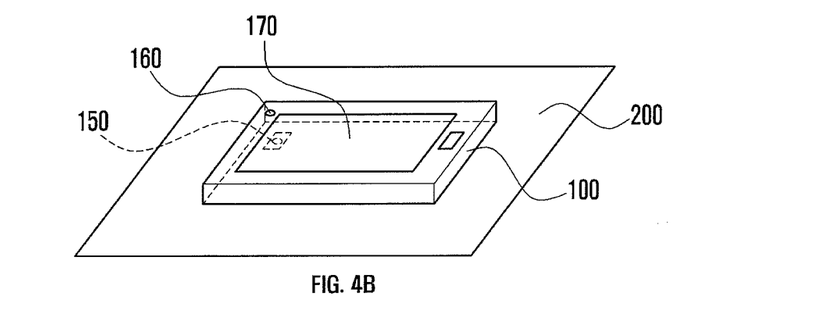

FIG. 4B illustrates the mobile terminal 100 in a state in which a front surface is uncovered and a rear surface is covered according to an exemplary embodiment of the present invention.

Referring to FIG. 4B, because the second camera module 160 is uncovered and the first camera module 150 is covered by the plane 200, an illuminance value measured in the first camera module 150 is relatively lower than an illuminance value measured in the second camera module 160. The controller 180 therefore determines that the mobile terminal 100 is in a state in which a front surface is uncovered and a rear surface is covered through a comparison between the illuminance values. That is, FIG. 4B depicts a case where the mobile terminal is positioned so as to be face up on plane 200.

If A/B is determined to be greater than 1/K, the controller 180 determines that the mobile terminal 100 is in a state where both a front surface and a rear surface are uncovered or covered at step 307. This indicates a case where A/B is determined to be a value between 1/K and K, and the controller 180 may determine that a user holds the mobile terminal 100, or may determine that the mobile terminal 100 is positioned within a bag or a pocket.

Figure 4C:
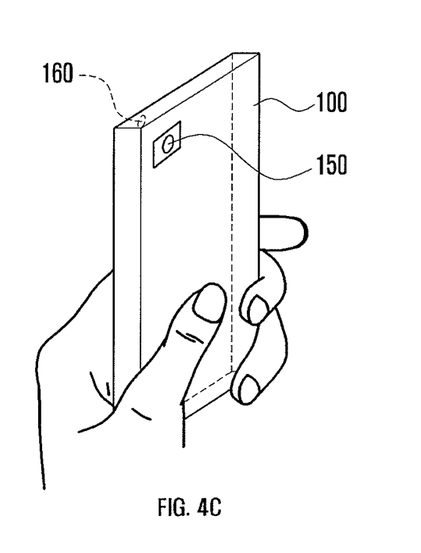

FIG. 4C illustrates the mobile terminal 100 in a state where a front surface and a rear surface are both uncovered according to an exemplary embodiment of the present invention.

Referring to FIG. 4C, because the first camera module 150 and the second camera module 160 are both uncovered, an illuminance value measured in the first camera module 150 and an illuminance value measured in the second camera module 160 will be determined to be the same or almost the same value.

The controller 180 determines that the mobile terminal 100 is in a state where both a front surface and a rear surface are uncovered through a comparison between the illuminance values.

If A/B is determined to be greater than or equal to 1/K at step 305, the controller 180 determines that the mobile terminal 100 will compare each of the first illuminance value A and the second illuminance value B with a specific critical illuminance value L, and determines whether both A and B are greater than or equal to L, or both A and B are less than L.

If both A and B are determined to be greater than or equal to L, the controller 180 determines that a user holds the mobile terminal 100.

If both A and B are determined to be less than L, the controller 180 determines that the mobile terminal 100 is positioned within a pocket or a bag.

For example, when L is preset to 30 lux, and when A and B are measured as 300 lux and 310 lux, respectively, the controller 180 determines that both A and B are greater than or equal to L and therefore determines that the user holds the mobile terminal 100.

Further, when L is preset to 30 lux, and when A and B are measured as 5 lux and 6 lux, respectively, the controller 180 determines that both A and B are less than L and therefore determines that the mobile terminal 100 is positioned within a pocket or a bag.

Figure 4D:
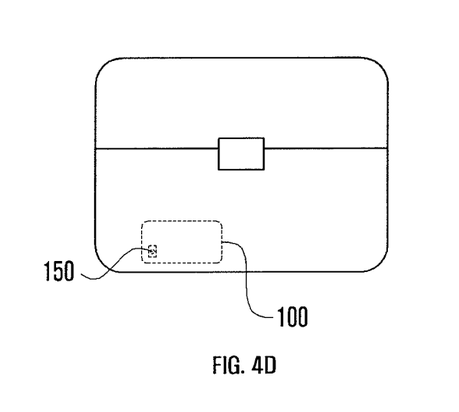

FIG. 4D illustrates the mobile terminal 100 put within a bag according to an exemplary embodiment of the present invention.

The controller 180 compares illuminance values received from each of the first camera module 150 and the second camera module 160 and a critical illuminance value, and if the illuminance values are smaller than the critical illuminance value, the controller 180 determines that the mobile terminal 100 is positioned at a location in which light is not transmitted, such as a bag or a pocket. Although the mobile terminal 100 is visibly depicted in FIG. 4D, this is only to aid understanding, and the bag may be assumed in this example to be substantially opaque.

Figure 5:
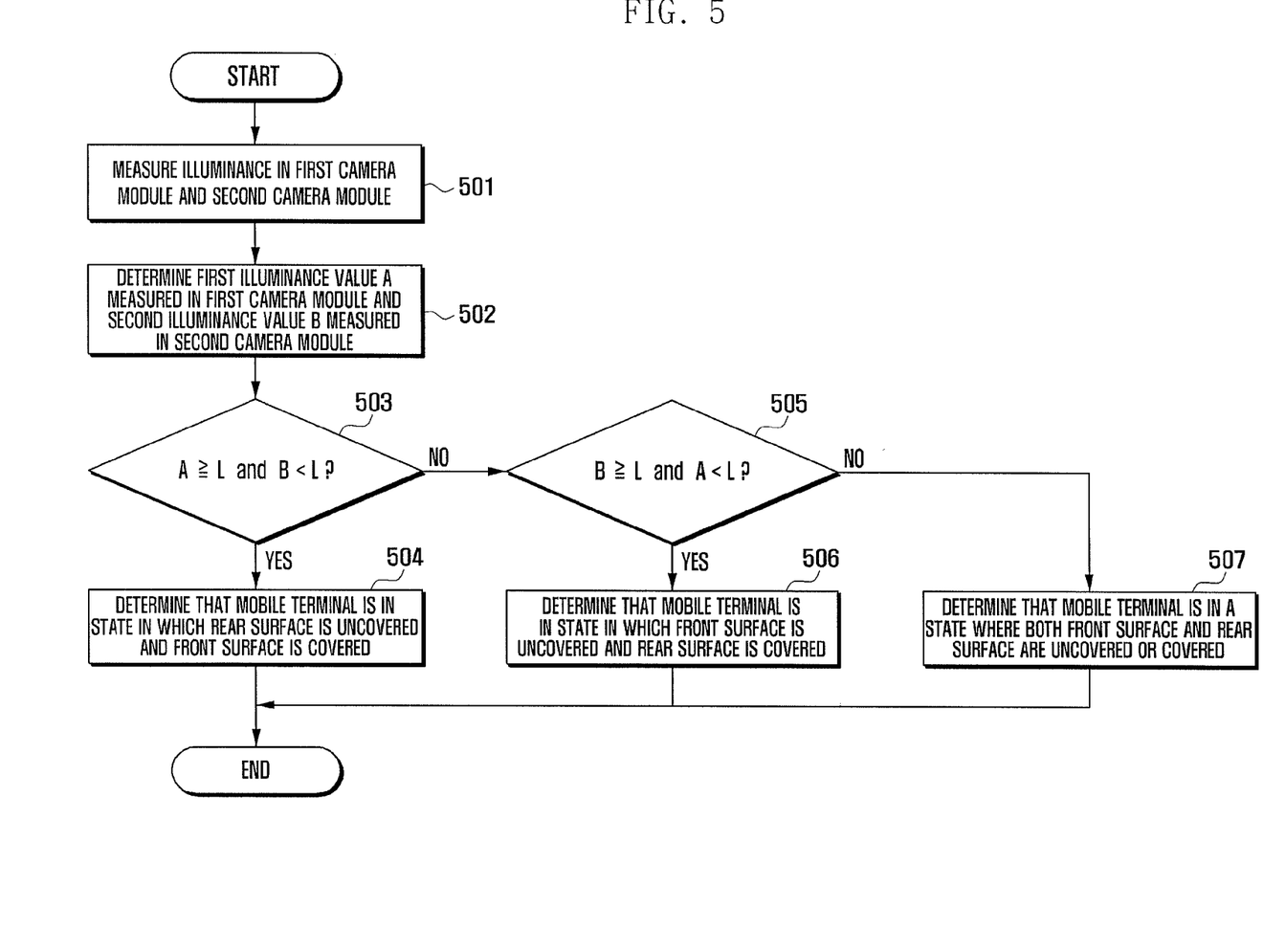
FIG. 5 is a flowchart illustrating a method of determining a posture of a mobile terminal according to a second exemplary embodiment of the present invention.

FIG. 5 is a flowchart illustrating a method of determining a posture of a mobile terminal 100 according to a second exemplary embodiment of the present invention.

Referring to FIG. 5, the controller 180 controls the first camera module 150 and the second camera module 160 to measure illuminance of a periphery of the mobile terminal 100 at step 501, and the controller 180 determines a first illuminance value A measured in the first camera module 150 and a second illuminance value B measured in the second camera module 160 at step 502.

Steps 501 and 502 correspond to steps 301 and 302 of FIG. 3, and a description of steps 301 and 302 of FIG. 3 is equally applied to steps 501 and 502.

The controller 180 determines whether A is greater than or equal to a predetermined critical illuminance value L and whether B is less than L at step 503.

When the mobile terminal 100 is on a substantially opaque plane in which light is not transmitted, one of the first camera module 150 and the second camera module 160 is covered by the plane and thus measures a low illuminance value. Here, L is a critical illuminance value for determining whether the first camera module 150 or the second camera module 160 is covered.

If A is determined to be greater than or equal to L and if B is determined to be less than L, the controller 180 determines that the mobile terminal 100 is in a state in which a rear surface is uncovered and a front surface is covered at step 504. For example, when L is preset to 30 lux, and when A and B are measured as 300 lux and 20 lux, respectively, the controller 180 determines that A is greater than or equal to L and B is less than L and therefore determines that the mobile terminal 100 is in a state in which a rear surface is uncovered and a front surface is covered.

If A is determined to be less than L or if B is determined to be greater than or equal to L, the controller 180 determines whether B is greater than or equal to L and A is less than L at step 505.

If B is determined to be greater than or equal to L and if A is determined to be less than L at step 503, the controller 180 determines that the mobile terminal 100 is in a state in which a front surface is uncovered and a rear surface is covered at step 506. For example, when L is preset to 30 lux, and when A and B are measured as 20 lux and 300 lux, respectively, the controller 180 determines that A is less than L and B is greater than or equal to L and therefore determines that the mobile terminal 100 is in a state in which a front surface is uncovered and a rear surface is covered.

If B is determined to be less than L or if A is determined to be greater than or equal to L at step 505, the controller 180 determines that the mobile terminal 100 is in a state where both a front surface and a rear surface are uncovered or covered at step 507. This indicates one of a case where both A and B are greater than or equal to L, or both A and B are less than L, and the controller 180 may accordingly determine that a user holds the mobile terminal 100, or may determine that the mobile terminal 100 is positioned in a bag or a pocket. Further, the controller 180 may determine that the mobile terminal 100 is in a propped-up or leaning position using a side surface thereof.

If B is determined to be less than L and if A is determined to be greater than or equal to L at step 505, the controller 180 determines whether both A and B are greater than or equal to L, or both A and B are less than L.

If both A and B are determined to be greater than or equal to L, the controller 180 determines that the user holds the mobile terminal 100.

If both A and B are determined to be less than L, the controller 180 determines that the mobile terminal 100 is positioned within a pocket or a bag.

For example, when L is preset to 30 lux, and when A and B are measured as 300 lux and 310 lux, respectively, the controller 180 determines that both A and B are greater than or equal to L and therefore determines that the user holds the mobile terminal 100. Further, when L is preset to 30 lux, and when A and B are measured as 5 lux and 6 lux, respectively, the controller 180 determines that both A and B less than L and therefore determines that the mobile terminal 100 is positioned within a pocket or a bag.

Figure 6:
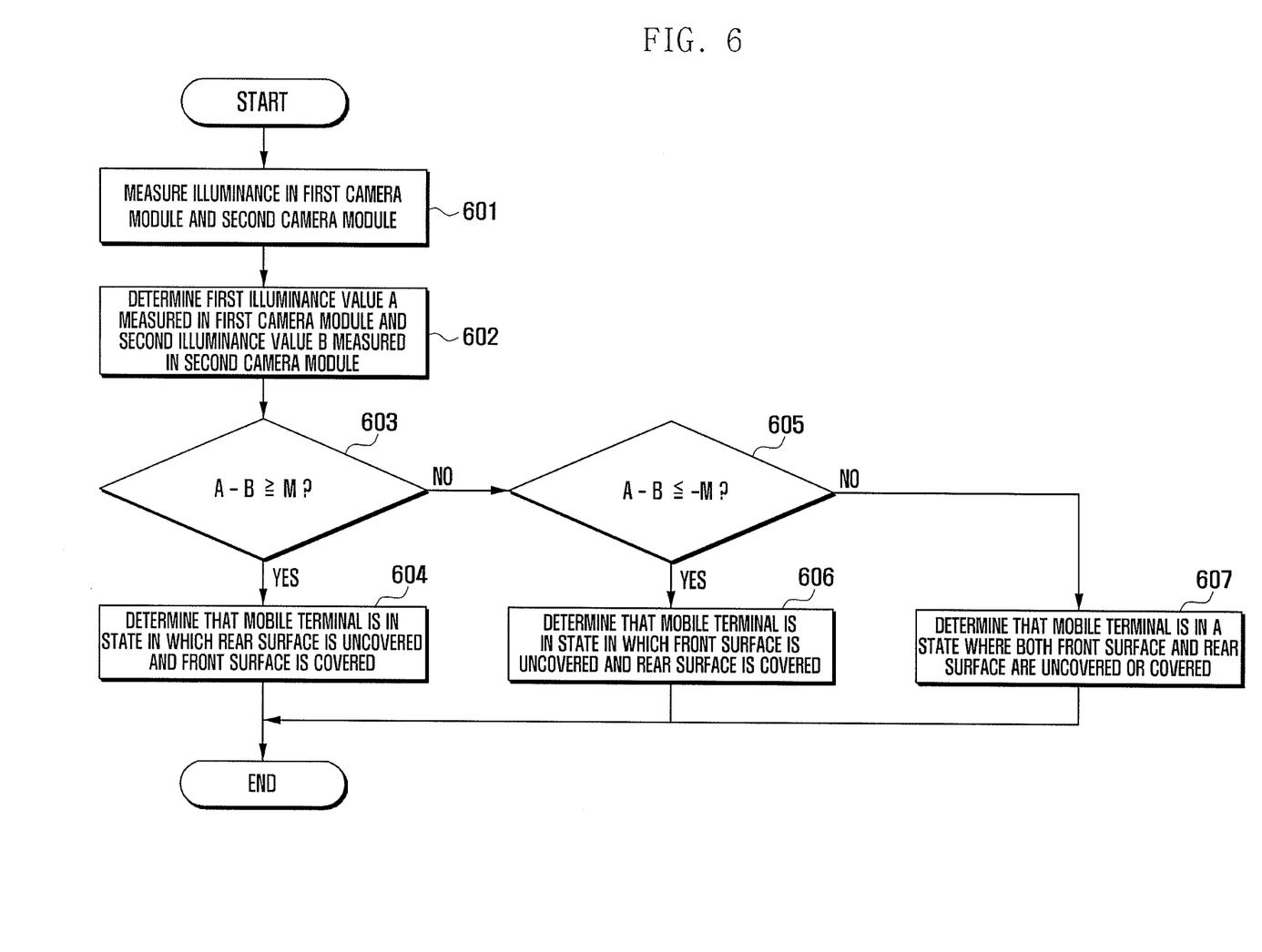
FIG. 6 is a flowchart illustrating a method of determining a posture of a mobile terminal according to a third exemplary embodiment of the present invention.

FIG. 6 is a flowchart illustrating a method of determining a posture of a mobile terminal 100 according to a third exemplary embodiment of the present invention.

Referring to FIG. 6, the controller 180 controls the first camera module 150 and the second camera module 160 to measure illuminance of a periphery of the mobile terminal 100 at step 601, and the controller 180 determines the first illuminance value A measured in the first camera module 150 and the second illuminance value B measured in the second camera module 160 at step 602.

Steps 601 and 602 correspond to steps 301 and 302 of FIG. 3, and a description of steps 301 and 302 of FIG. 3 is equally applied to steps 601 and 602.

The controller 180 calculates a difference value A-B between the first illuminance value A and the second illuminance value B, and determines whether the difference value A-B is greater than or equal to a predetermined critical value M at step 603.

When the mobile terminal 100 is on a substantially opaque plane in which light is not transmitted, one of the first camera module 150 and the second camera module 160 is covered by the plane and another one is uncovered. In this case, a difference exists between the first illuminance value A measured in the first camera module 150 and the second illuminance value B measured in the second camera module 160. Here, M corresponds to an illuminance difference value for determining whether the first camera module 150 or the second camera module 160 is covered.

If A-B is determined to be greater than or equal to M, the controller 180 determines that the mobile terminal 100 is in a state in which a rear surface is uncovered and a front surface is covered at step 604. That is, the controller 180 determines that the mobile terminal 100 is turned over so as to be face down. For example, when M is preset to 200 lux, and when A and B are measured as 300 lux and 20 lux, respectively, the controller 180 determines that A-B (280 lux) is greater than or equal to M (200 lux) and therefore determines that the mobile terminal 100 is in a state in which a rear surface is uncovered and a front surface is covered.

If A-B is determined to be less than M, the controller 180 determines whether A-B is equal to or less than −M at step 605.

If A-B is determined to be equal to or less than −M at step 605, the controller 180 determines that the mobile terminal 100 is in a state in which a front surface is uncovered and a rear surface is covered at step 606. That is, the controller 180 determines that the mobile terminal 100 is put in a forward or face-up direction.

For example, when M is preset to 200 lux, and when A and B are measured as 20 lux and 300 lux, respectively, the controller 180 determines that A-B (−280 lux) is equal to or less than −M (−200 lux) and therefore determines that the mobile terminal 100 is in a state in which a front surface is uncovered and a rear surface is covered.

If A-B is determined to be greater than −M at step 605, the controller 180 determines that the mobile terminal 100 is in a state where both a front surface and a rear surface are uncovered or covered at step 607. This indicates a case where A-B is determined to be a value between −M and M, and the controller 180 may determine that a user holds the mobile terminal 100 or may determine that the mobile terminal 100 is within a bag or a pocket. Further, the controller 180 may determine that the mobile terminal 100 is in a propped-up or leaning position using a side surface thereof If A-B is determined to be greater than −M at step 605, the controller 180 compares each of the first illuminance value A and the second illuminance value B with a predetermined critical illuminance value L and determines whether both A and B are greater than or equal to L, or both A and B are less than L.

If both A and B are determined to be greater than or equal to L, the controller 180 determines that the user holds the mobile terminal 100.

If both A and B are determined to be less than L, the controller 180 determines that the mobile terminal 100 is positioned within a pocket or a bag. For example, when L is preset to 30 lux, and when A and B are measured as 300 lux and 310 lux, respectively, the controller 180 determines that both A and B are greater than or equal to L and therefore determines that the user holds the mobile terminal 100. Further, when L is preset to 30 lux, and when A and B are measured as 5 lux and 6 lux, respectively, the controller 180 determines that both A and B are less than L and therefore determines that the mobile terminal 100 is positioned within a pocket or a bag.

When the controller 180 determines a posture of the mobile terminal as described above, the controller will then adjust one or more functions of the mobile terminal accordingly.

When the controller 180 determines that the mobile terminal 100 is in a state in which a rear surface is uncovered and a front surface is covered, the controller 180 converts a mode of the mobile terminal 100 to a silent mode that does not output sound. Further, when the controller 180 determines that the mobile terminal 100 is in a state in which a front surface is uncovered and a rear surface is covered, the controller 180 converts a mode of the mobile terminal 100 to a general mode that outputs sound. Further, when the controller 180 determines that the user holds the mobile terminal 100, in order to notify an occurrence of an event while the user is absent, the controller 180 controls the audio processor 120 to output a predetermined sound or controls the display unit 170 to output a predetermined image. When the controller 180 determines that the mobile terminal 100 is positioned within a bag or a pocket, the controller 180 controls the display unit 170 to turn off and converts a mode of the mobile terminal 100 to a low power mode.

As described above, according to exemplary embodiments of the present invention, a posture of the mobile terminal can be determined without an acceleration sensor or a gyro sensor.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of determining a posture of a mobile terminal comprising a first camera module located in a rear surface thereof and a second camera module located in a front surface thereof, the method comprising:
measuring illuminance in each of the first camera module and the second camera module;
comparing an illuminance value measured in the first camera module and an illuminance value measured in the second camera module with a predetermined critical value; and
determining a posture of the mobile terminal according to a result of the comparison.

2. The method of claim 1, wherein the comparing of the illuminance value measured in the first camera module and the illuminance value measured in the second camera module with the predetermined critical value comprises comparing a value A/B, where an illuminance value A measured in the first camera module is divided by an illuminance value B measured in the second camera module, with a predetermined critical value K.

3. The method of claim 2, wherein the determining of the posture of the mobile terminal according to the comparison result comprises:
determining, when A/B is determined to be greater than or equal to K, that the mobile terminal is in a state in which a rear surface thereof is uncovered; and
determining, when A/B is determined to be equal to or less than 1/K, that the mobile terminal is in a state in which a front surface thereof is uncovered.

4. The method of claim 3, wherein the determining of the posture of the mobile terminal according to the comparison result further comprises determining, when A/B is determined to be a value between 1/K and K, that the mobile terminal is in a state where both a front surface and a rear surface thereof are uncovered or covered.

5. The method of claim 1, wherein the measuring of the illuminance in each of the first camera module and the second camera module comprises periodically measuring illuminance in each of the first camera module and the second camera module with a predetermined cycle.

6. The method of claim 1, wherein the comparing of the illuminance value measured in the first camera module and the illuminance value measured in the second camera module with the predetermined critical value comprises comparing a value A-B that subtracts an illuminance value B measured in the second camera module from an illuminance value A measured in the first camera module with a predetermined critical value M.

7. The method of claim 6, wherein the determining of the posture of the mobile terminal according to the comparison result comprises:
determining, when A-B is determined to be greater than or equal to M, that the mobile terminal is in a state in which a rear surface thereof is uncovered; and
determining, when A-B is determined to be equal to or less than −M, that the mobile terminal is in a state in which a front surface thereof is uncovered.

8. The method of claim 7, wherein the determining of the posture of the mobile terminal according to the comparison result further comprises determining, when A-B is determined to be a value between −M and M, that the mobile terminal is in a state where both a front surface and a rear surface thereof are uncovered or covered.

9. The method of claim 1, wherein the comparing of the illuminance value measured in the first camera module and the illuminance value measured in the second camera module with the predetermined critical value comprises comparing each of an illuminance value A measured in the first camera module and an illuminance value B measured in the second camera module with a predetermined critical illuminance value L.

10. The method of claim 9, wherein the determining of the posture of the mobile terminal according to the comparison result comprises:
determining, when A is determined to be greater than or equal to L and when B is determined to be less than L, that the mobile terminal is in a state in which a rear surface thereof is uncovered; and
determining, when the B is determined to be greater than or equal to L and when A is determined to be less than L, that the mobile terminal is in a state in which a front surface thereof is uncovered.

11. The method of claim 10, wherein the determining of the posture of the mobile terminal according to the comparison result further comprises, when A is determined to be greater than or equal to L and when B is determined to be greater than or equal to L, or when A is determined to be less than L and when B is determined to be less than L, that the mobile terminal is in a state where both a front surface and a rear surface thereof are uncovered or covered.

12. A mobile terminal comprising:
a first camera module located in a front surface of the mobile terminal and for measuring illuminance;
a second camera module located in a rear surface of the mobile terminal and for measuring illuminance; and
a controller for comparing an illuminance value measured in the first camera module and an illuminance value measured in the second camera module with a predetermined critical value and for determining a posture of the mobile terminal according to a result of the comparison.

13. The mobile terminal of claim 12, wherein the controller compares a value A/B in which an illuminance value A measured in the first camera module is divided by an illuminance value B measured in the second camera module with a predetermined critical value K, and determines, when A/B is determined to be greater than or equal to K, that the mobile terminal is in a state in which a rear surface thereof is uncovered, and determines, when A/B is determined to be equal to or less than 1/K, that the mobile terminal is in a state in which a front surface thereof is uncovered.

14. The mobile terminal of claim 12, wherein the controller compares a value A-B that subtracts an illuminance value B measured in the second camera module from an illuminance value A measured in the first camera module with a predetermined critical value M and determines, when A-B is determined to be greater than or equal to M, that the mobile terminal is in a state in which a rear surface thereof is uncovered, and determines, when A-B is determined to be equal to or less than −M, that the mobile terminal is in a state in which a front surface thereof is uncovered.

15. The mobile terminal of claim 12, wherein the controller compares each of an illuminance value A measured in the first camera module and an illuminance value B measured in the second camera module with a predetermined critical value M, and determines, when A is determined to be greater than or equal to L and when B is determined to be less than L, that the mobile terminal is in a state in which a rear surface thereof is uncovered, and determines, when B is determined to be greater than or equal to L and when A is determined to be less than L, that the mobile terminal is in a state in which a front surface thereof is uncovered.

* * * * *